(12) United States Patent
Light-Holets et al.

(10) Patent No.: US 12,479,437 B2
(45) Date of Patent: Nov. 25, 2025

(54) SYSTEMS AND METHODS FOR VEHICLE CONTROL IN RESPONSE TO A PASSING OPPORTUNITY

(71) Applicant: Cummins Inc., Columbus, IN (US)

(72) Inventors: Jennifer Kay Light-Holets, Greenwood, IN (US); J. Steven Kolhouse, Columbus, IN (US)

(73) Assignee: Cummins Inc., Columbus, IN (US)

( * ) Notice: Subject to any disclaimer, the term of this patent is extended or adjusted under 35 U.S.C. 154(b) by 205 days.

(21) Appl. No.: 18/062,086

(22) Filed: Dec. 6, 2022

(65) Prior Publication Data
US 2024/0182034 A1    Jun. 6, 2024

(51) Int. Cl.
| | |
|---|---|
| *B60W 30/18* | (2012.01) |
| *B60W 40/04* | (2006.01) |
| *B60W 40/06* | (2012.01) |
| *B60W 50/12* | (2012.01) |
| *B60W 50/14* | (2020.01) |
| *G08G 1/01* | (2006.01) |
| *G08G 1/052* | (2006.01) |
| *G08G 1/16* | (2006.01) |

(52) U.S. Cl.
CPC ...... *B60W 30/18163* (2013.01); *B60W 40/04* (2013.01); *B60W 40/06* (2013.01); *B60W 50/12* (2013.01); *B60W 50/14* (2013.01); *G08G 1/0112* (2013.01); *G08G 1/052* (2013.01); *G08G 1/166* (2013.01)

(58) Field of Classification Search
CPC ........... B60W 30/18163; B60W 40/04; B60W 40/06; B60W 50/12; B60W 50/14; G08G 1/0112; G08G 1/052; G08G 1/166

USPC ..................... 701/117, 96; 180/170; 340/903
See application file for complete search history.

(56) References Cited

U.S. PATENT DOCUMENTS

| | | | |
|---|---|---|---|
| 6,842,687 B2 | 1/2005 | Winner et al. | |
| 9,156,470 B2 | 10/2015 | Hartl et al. | |
| 9,688,278 B2 | 6/2017 | Harda et al. | |
| 9,847,023 B2 | 12/2017 | Huelbusch | |
| 10,410,524 B2 | 9/2019 | Norwood | |
| 2002/0112489 A1* | 8/2002 | Egawa | F16D 61/00 62/133 |
| 2007/0241723 A1* | 10/2007 | Billat | H02J 7/1446 |
| 2008/0306670 A1* | 12/2008 | Masterson | B60W 10/06 |
| 2010/0030447 A1* | 2/2010 | Smyth | B60W 30/188 |
| 2011/0153141 A1* | 6/2011 | Beechie | G01F 9/023 |

(Continued)

FOREIGN PATENT DOCUMENTS

| | | |
|---|---|---|
| DE | 3622447 C1 | 1/1988 |
| DE | 102011118336 A1 | 6/2012 |

(Continued)

*Primary Examiner* — Ramon A. Mercado
*Assistant Examiner* — Ellis B. Ramirez
(74) *Attorney, Agent, or Firm* — Taft, Stettinius & Hollister LLP

(57) ABSTRACT

System, apparatus, and methods are disclosed for identifying passing opportunities for a vehicle and controlling the vehicle in response to the passing opportunities. For example, operation of one or more components of the vehicle can be changed in advance of attempting the pass to better prepare the vehicle for acceleration to initiate and complete the pass attempt. Operation of one or more components of the vehicle can be changed during passing to assist the vehicle in completing the pass.

19 Claims, 3 Drawing Sheets

(56) References Cited

U.S. PATENT DOCUMENTS

| | | | | |
|---|---|---|---|---|
| 2011/0313665 | A1* | 12/2011 | Lueke | G01S 13/931 |
| 2012/0232731 | A1* | 9/2012 | Sujan | B60W 50/0097 |
| 2016/0129919 | A1* | 5/2016 | Kubo | B60W 40/105 |
| 2016/0214613 | A1* | 7/2016 | Herzhauser | B60W 10/06 |
| 2018/0057001 | A1* | 3/2018 | Hu | B60W 30/18027 |
| 2018/0081371 | A1* | 3/2018 | Bar-Tal | G05D 1/0253 |
| 2018/0148061 | A1* | 5/2018 | Reckziegel | B60W 50/14 |
| 2019/0318627 | A1* | 10/2019 | Raaijmakers | G08G 1/09626 |
| 2021/0269042 | A1* | 9/2021 | Sujan | B60W 30/18163 |
| 2022/0089143 | A1* | 3/2022 | Bryan | B60W 50/14 |

FOREIGN PATENT DOCUMENTS

| | | | |
|---|---|---|---|
| EP | 1486369 | A1 | 12/2004 |
| WO | 2006087282 | A1 | 8/2006 |
| WO | 2020139814 | A1 | 7/2020 |

\* cited by examiner

SYSTEMS AND METHODS FOR VEHICLE CONTROL IN RESPONSE TO A PASSING OPPORTUNITY

FIELD OF THE DISCLOSURE

The present application generally relates to systems and methods for vehicle control, and more particularly to vehicle control in response to an opportunity to pass another vehicle or object along a route.

BACKGROUND

A vehicle travelling in a lane of travel along a roadway or other route may encounter a slow moving or stationary obstruction, such as another vehicle or an object, in the lane of travel. For two lane roadways, it is necessary for the vehicle to enter the lane used by oncoming traffic in order to pass the obstruction. However, identifying the availability of a passing opportunity and assessing the ability to complete the pass may be difficult due to one or more conditions, such as the terrain, traffic patterns, weather, speed limits, vehicle capabilities, speed of the obstruction and other vehicles, distance available for the pass, operating parameters of the vehicle, etc. In addition, current operational states of one or more devices of the vehicle may inhibit or reduce the ability of the vehicle to complete the pass. Therefore, a need remains for further improvements in systems and methods for identifying a passing opportunity and controlling a vehicle in response to the same.

SUMMARY

Embodiments include a unique system, method, and/or apparatus for identifying a passing opportunity along a roadway, controlling a vehicle in response to the passing opportunity before initiating the pass to improve or increase the passing capabilities of the vehicle, and/or controlling the vehicle during the pass to improve the passing performance of the vehicle.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
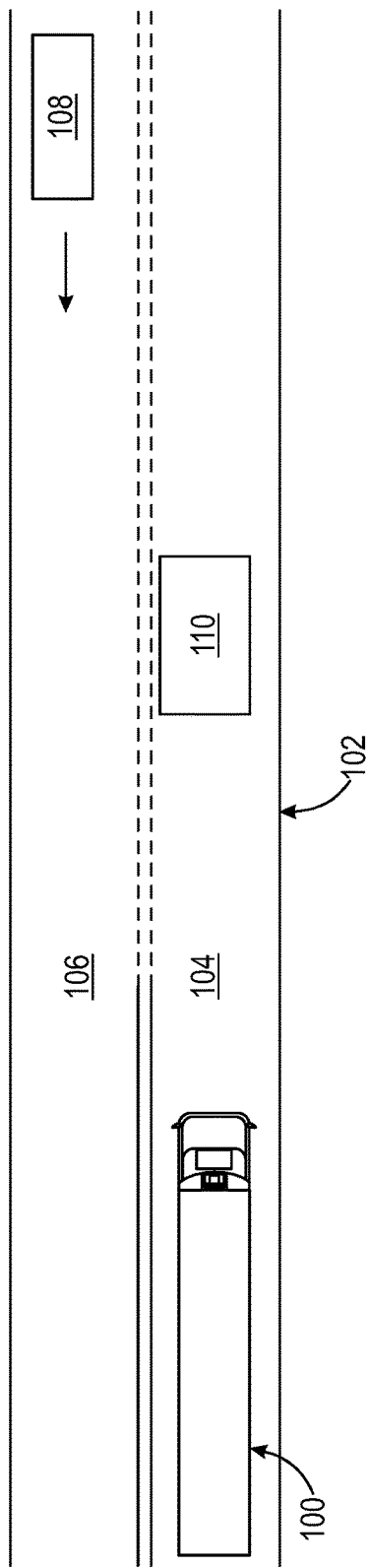
FIG. 1 is a schematic illustration of a vehicle and a roadway with an obstruction in a travel lane.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated a schematic view of an example vehicle 100. In the illustrated example, vehicle 100 is depicted as operating in a travel lane 104 of a roadway 102. Roadway 102 also includes a passing lane 106 in which one or more other vehicles 108 travel in a direction opposite of vehicle 100. In some instances, roadway 102 may include an obstruction 110 in travel lane 104, such as a slow moving vehicle, farm equipment, bicycle, scooter, horse, horse-and-buggy, stationary object, construction, etc.

Figure 2:
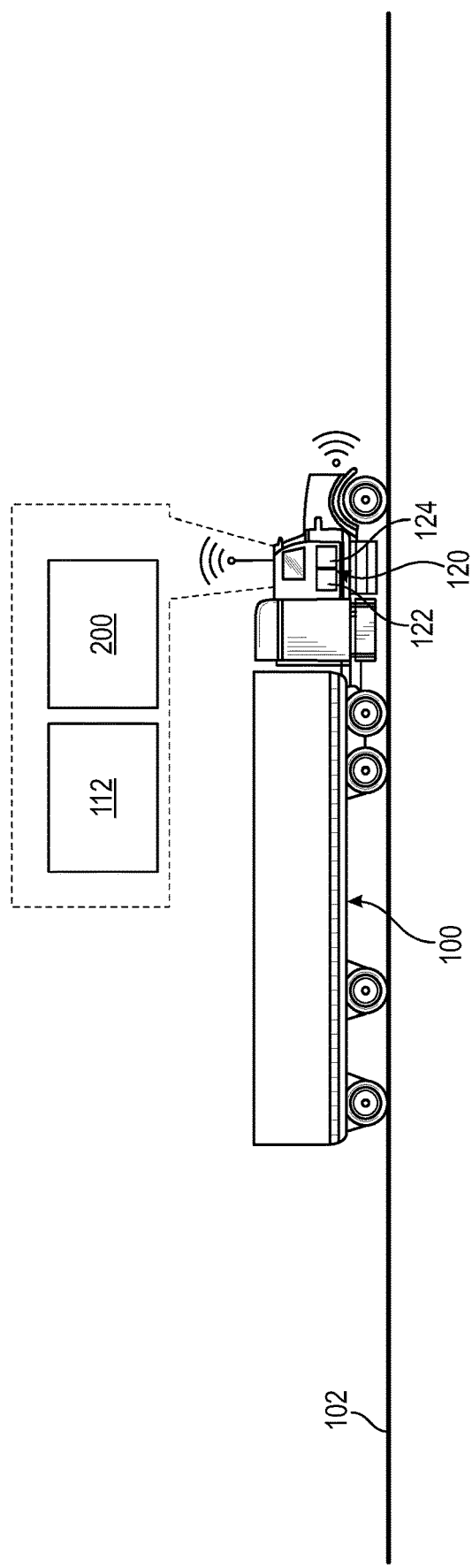
FIG. 2 is a schematic illustration of the vehicle of FIG. 1 including a prime mover system and electronic control system.

Referring further to FIG. 2, vehicle 100 includes an electronic control system (ECS) 200 configured to detect obstruction 110 in travel lane 104, identify a passing opportunity for vehicle 100 to pass obstruction 110 using passing lane 106, alter one or more operating parameters of vehicle 100 to assist vehicle 100 in initiating and completing the passing opportunity before the driver of vehicle 100 initiates the pass attempt, and alter one or more additional operating parameters of vehicle 100 to assist vehicle 100 in completing the pass during the pass attempt. ECS 200 may further be configured to identify the passing lane 106, alert the driver of the passing opportunity, and/or cancel the alert when conditions indicate the passing opportunity is no longer available or feasible.

Vehicle 100 can be controlled entirely by the driver and/or with assistance from an advanced driver assistance system 112. The advanced driver assistance system 112 may be, for example, any electronic control system or apparatus to assist the driver in operating vehicle 100, such as those used for dynamic powertrain control in response to look ahead route data, for adaptive cruise control (ACC), cooperative adaptive cruise control (CACC), or predictive adaptive cruise control (PACC).

Vehicle 100 is illustrated as a tractor-trailer, may be any of a variety of types of vehicles, examples of which include trucks, semis, tractor-trailers, box trucks, buses, and passenger cars. In the illustrated example, vehicle 100 is depicted operating in isolation, but may also be operated cooperatively such as in a platoon or convoy.

Vehicle 100 includes a prime mover system 120 which may be provided and configured as any one or combination of an internal combustion engine system, a battery-electric motor system, a hybrid system including an internal combustion engine and a battery-electric motor system, or a fuel cell-electric system, structured to output power to propel the vehicle 100. Prime mover system 120 includes a prime mover 122 and a drivetrain 124. The prime mover 122 of prime mover system 120 may be part of any size, power, or type of powertrain (e.g., diesel engine powertrains, gasoline engine powertrains, natural gas powertrains, hydrogen combustion powertrains, hydrogen fuel cell, hybrid-electric powertrains, and electric powertrains). Prime mover 122 is connected to drivetrain 124 provide output power to propel vehicle 100.

Vehicle 100 may utilize one or more environmental sensors to determine its positioning relative to other vehicles on roadway 102. Examples of the types of sensor systems that may be utilized include RADAR systems, LIDAR systems, proximity sensor systems, camera systems, and combinations of these and/or other sensor systems. Vehicle 100 may also include a wireless communication system allowing vehicle-to-vehicle (V2V) communication or vehicle-to-X (V2X) communication where X denotes a variety of possible types of external networks including, for example, networks associated with stationary infrastructure assets and intelligent transportation systems. In an embodiment, ECS 200 of vehicle 100 is configured and operable to send and receive vehicle to anything (V2X), such as vehicle to infrastructure transmissions, and/or vehicle-to-vehicle (V2V) transmissions in a bi-directional manner.

Vehicle 100 includes ECS 200 which is which is structured to control and monitor operation of vehicle 100, as well as to identify and participate in one or more of the passing control operations as disclosed herein. An example ECS 200 comprises one or more integrated circuit-based electronic control units (ECU) or other control components which may be operatively coupled to one another over a communication bus or network such as a controller area network (CAN) and which are structure to implement various controls, for example, an engine or prime mover ECU structured to control and monitor operation of a prime mover and prime mover operated accessories, a transmission ECU structured to control and monitor operation of a transmission, a wireless communication ECU structured to control ex-vehicle wireless communications, and one or more environmental sensor ECUs structured to control operation of an environmental sensor system may be provided. It shall be appreciated that the control logic and control processes disclosed herein may be performed by control systems, control units, and/or controls which are implemented in dedicated control components of the ECS 200 (e.g., in a dedicated ECU or other dedicated control circuitry) or may be implemented in a distributed fashion across multiple control components of ECS 200 (e.g., through coordinated operation of a prime mover ECU, a transmission ECU, a wireless communication ECU and an environmental sensor ECU).

The ECUs and other control components of the ECS 200 may comprise digital circuitry, analog circuitry, or hybrid combinations of both of these types. The ECUs and other control components of the ECS 200 can be programmable, an integrated state machine, or a hybrid combination thereof. The ECUs and other control components of the ECS 200 can include one or more Arithmetic Logic Units (ALUs), Central Processing Units (CPUs), memories, limiters, conditioners, filters, format converters, or the like which are not shown to preserve clarity. In one form, the ECS 200 is of a programmable variety that executes algorithms and processes data in accordance with operating logic that is defined by executable program instructions stored in a non-transitory memory medium (e.g., software or firmware). Alternatively or additionally, operating logic for the ECS 200 can be at least partially defined by hardwired logic or other hardware.

It shall be appreciated that electronic control systems and components thereof disclosed herein may be configured to determine or obtain a parameter, quantity, value or other operand based upon another parameter, quantity, value or other operand in a number of manners including, for example, by calculation, computation, estimation or approximation, look-up table operation, receiving a parameter, quantity, value or other operand from one or more other components or systems and storing such received parameter, quantity, value or other operand in a non-transitory memory medium associated with the electronic control systems or components thereof, other determination techniques or techniques of obtaining as would occur to one of skill in the art with the benefit of the present disclosure, or combinations thereof. Likewise the disclosed acts of determination or determining or obtaining a parameter, quantity, value or other operand based upon another parameter, quantity, value or other operand may comprise a number of acts including, for example, acts of calculation, computation, estimation or approximation, look-up table operation, receiving a parameter, quantity, value or other operand from one or more other components or systems and storing such received parameter, quantity, value or other operand in a non-transitory memory medium associated with the electronic control systems or components thereof, other determination techniques or techniques of obtaining as would occur to one of skill in the art with the benefit of the present disclosure, or combinations thereof.

The environmental sensor and/or communication capabilities of vehicle 100 allows its operation to be controlled for passing obstruction 110. For example, ECS 200 may be configured to identify obstruction 110 in the travel lane 104, identify a passing lane 106 that allows vehicle 100 to pass obstruction 110, identify a passing opportunity for vehicle 100 to pass obstruction 110 using the passing lane 106, and alert the driver of the passing opportunity. Vehicle 100 may be pre-emptively prepared by ECS 200 for passing obstruction 110 using the passing lane 106 prior to the drive initiating a pass attempt by altering one or more operating parameters of vehicle 100 based on the ECS 200 identifying the passing opportunity. The ECS 200 may also assist the driver in completing the pass by altering one or more other operating parameters during the pass.

Figure 3:
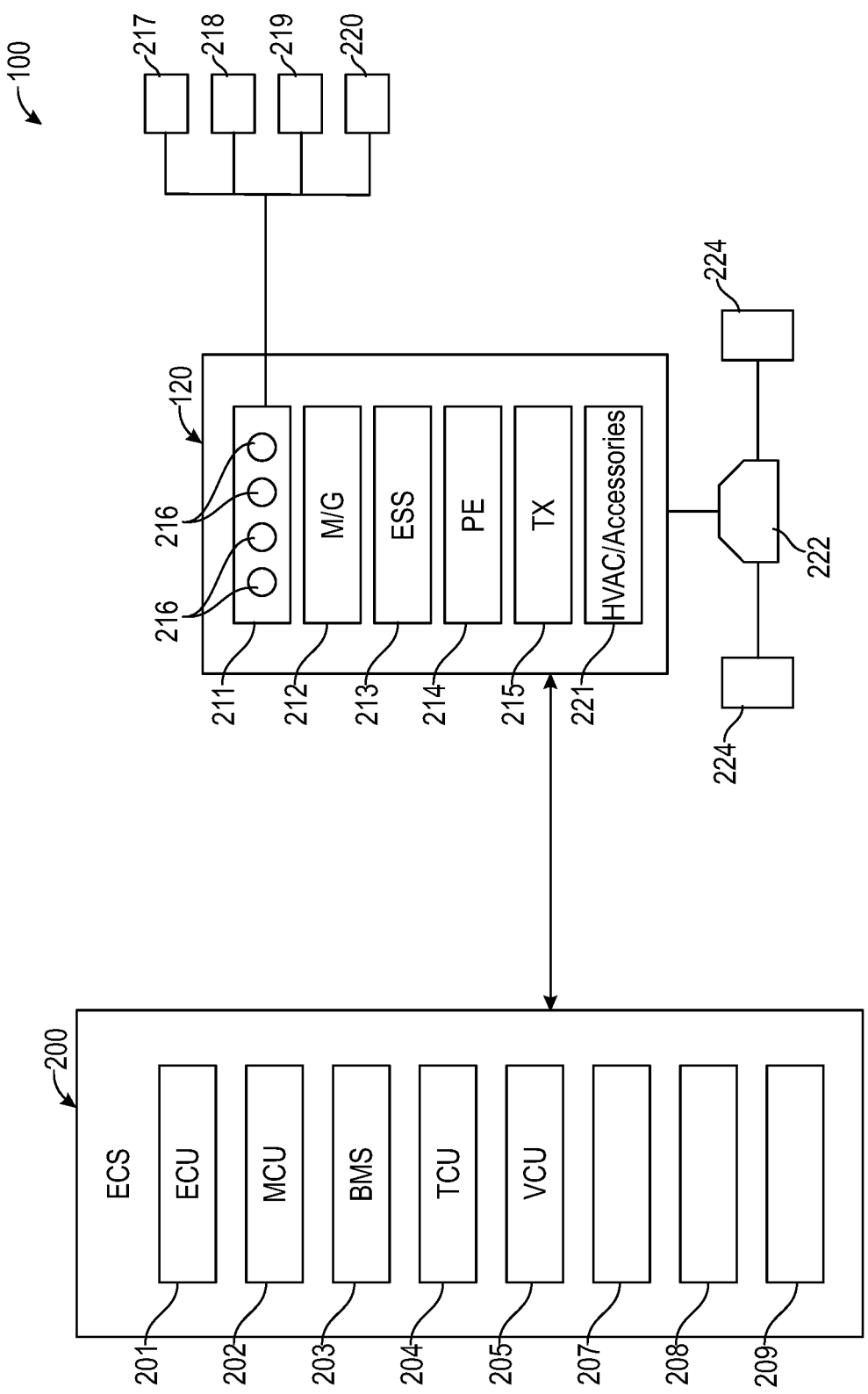
FIG. 3 is a schematic illustration of the vehicle of FIGS. 1-2 with an embodiment of a prime mover system and electronic control system.

With reference to FIG. 3, there is illustrated vehicle 100 according to one example embodiment. Vehicle 100 in FIG. 3 is one example of a vehicle configuration that may be provided, and vehicle 100 includes ECS 200 which is one example of an electronic control system configuration that may be provided. It shall be appreciated that in other embodiments and forms, vehicle 100 and/or ECS 200 may include additional or alternative features including, for example, the alternatives, options, drivetrains, powertrains, prime movers, and variations disclosed elsewhere herein.

Vehicle 100 includes a prime mover system 120 and ECS 200 which are operatively coupled and in operative communication with one another. In the illustrated example, prime mover system 120 is provided and configured as a hybrid system including an internal combustion engine system (ICE) 211, a motor/generator system (M/G) 212 configured for vehicle propulsion or traction, an energy storage system (ESS) 213, a power electronics system (PE) 214 which may be associated with or provided as a part of M/G 212 and/or ESS 213, and a transmission system (TX) 215. ICE 211 may include a plurality of cylinders 216, one or more of which can be selectably deactivated by a cylinder deactivation system 220 during operation of ICE 211 for improvement of fuel economy.

In other embodiments, the prime mover system 120 may be provided and configured in different forms and types such as the forms and types described elsewhere herein. For example, ICE 211 may include a turbocharger 217, exhaust gas recirculation system 218, aftertreatment system 219, etc. depending on the type of prime mover system 120 that is employed. In the illustrated example, prime mover system 120 operatively coupled with and configured to output torque to drive wheels 224 via a differential 222 to move the vehicle 100. In other embodiments, prime mover system may be configured in other manners and operatively coupled with wheels, other ground contacting members, or other vehicle propulsion members to move the vehicle.

ECS 200 comprises control circuitry configured to control a number of operational aspects of prime mover system 120 as well as other operational aspects of vehicle 100. The control circuitry of ECS 200 may be provided in a number of forms and combinations. In some embodiments, the control circuitry of ECS 200 may be provided in whole or in part by one or more microprocessors, microcontrollers, other integrated circuits, or combinations thereof which are configured to execute instructions stored in a non-transitory memory medium, for example, in the form of stored firmware and/or stored software. It shall be appreciated that microprocessor, microcontroller and other integrated circuit implementations of the control circuitry disclosed herein may comprise multiple instances of control circuitry which utilize common physical circuit elements. For example, first control circuitry may be provided by a combination of certain processor circuitry and first memory circuitry, and second control circuitry may be provided by a combination of, at least in part, that certain processor circuitry and second memory circuitry differing from the first memory circuitry.

It shall be further appreciated that the control circuitry of ECS 200 may additionally or alternatively comprise other digital circuitry, analog circuitry, hybrid analog-digital circuitry, or combinations thereof. Some non-limiting example elements of such circuitry include application specific integrated circuits (ASICs), arithmetic logic units (ALUs), amplifiers, analog calculating machine(s), analog to digital (A/D) and digital to analog (D/A) converters, clocks, communication ports, field programmable gate arrays (FPGAs), filters, format converters, modulators or demodulators, multiplexers, and de-multiplexers, non-transitory memory devices and media, oscillators, processors, processor cores, signal conditioners, state machine(s), and timers. As with microprocessor, microcontroller, and other integrated circuit implementations, such alternate or additional implementations may implement or utilize multiple instances of control circuitry which utilize common physical circuit elements. For example, first control circuitry may be provided by a combination of first control circuitry elements and second control circuitry elements, and second control circuitry may be provided by a combination of the first control circuitry elements and third control circuitry elements differing from the first control circuitry elements.

ECS 200 may in principle be provided as a single component or physical unit or a collection of operatively coupled components or physical units. In a number of embodiment, ECS 200 may be a multi-component or multi-unit form. When of a multi-component or multi-unit form, ECS 200 may have one or more components remotely located relative to the others in a distributed arrangement and may distribute the control function across one or more control units or devices.

In the illustrated example, ECS 200 is provided in a multi-component or multi-unit form including multiple electronic control units. ECS 200 includes engine control unit (ECU) 201 which is configured and operable to control aspects of at least ICE 211 and may also be configured and operable to control or influence operation of other systems of vehicle 100, such as turbocharger 217, exhaust gas recirculation system 218, aftertreatment system 219, and/or cylinder deactivation system 220. In the illustrated example, ECU 201 is depicted as a singular unit, it being appreciated that ECU 201 may comprise multiple units in some embodiments.

ECS 200 includes motor/generator control unit (MCU) 202 which is configured and operable to control aspects of at least M/G 212, may also be operable to control aspects of PE 214, and may also be configured and operable to control or influence operation of other systems of vehicle 100. In the illustrated example, MCU 202 is depicted as a singular unit, it being appreciated that MCU 202 may comprise multiple units in some embodiments. MCU 202 can, for example, control M/G 212 to provide power to propel vehicle 100, either alone or in conjunction with ICE 211, to charge battery of ESS 213, to provide cooling of M/G 212 and/or PE 214, or other operations.

ECS 200 includes battery management system (BMS) 203 which is configured and operable to control aspects of at least ESS 213, such as a battery state of charge and/or temperature of the battery, and may also be operable to control aspects of PE 214, such as cooling or heating of PE 214 and/or power drawn from or provided to PE 214. BMS 203 may also be configured and operable to control or influence operation of other systems of vehicle 100. In the illustrated example, BMS 203 is depicted as a singular unit, it being appreciated that BMS 203 may comprise multiple units in some embodiments.

ECS 200 includes transmission control unit (TCU) 204 which is configured and operable to control aspects of at least TX 215 and may also be configured and operable to control or influence operation of other systems of vehicle 100. In the illustrated example, TCU 204 is depicted as a singular unit, it being appreciated that TCU 204 may comprise multiple units in some embodiments.

ECS 200 includes vehicle control unit (VCU) 205 which is configured and operable to control additional aspects of vehicle 100 including aspects not directly relating ICE 211, M/G 212, ESS 213, PE 214, or TX 215, but may also be configured and operable to control or influence operation of the foregoing or other systems of vehicle 100. For example, VCU 205 can control cooling or heating of one or more components and/or fluids of vehicle 100, such as ICE 211, the interior of vehicle 100, aftertreatment system 219, oil temperature, and/or exhaust temperature. In another example, VCU 205 can control the on/off state of one or more accessories of vehicle 100 to limit or control the use of accessories, such as pumps, cooling fans, etc. In another example, VCU 205 can control the on/off status and/or suspend of advance driver assistance system 112, alter or suspend road speed governor limits, identify and suspend the use of non-essential accessories, etc. In the illustrated example, VCU 205 is depicted as a singular unit, it being appreciated that VCU 205 may comprise multiple units in some embodiments.

ECS 200 includes a telematics system 207 which may include one or more telematics components or systems such as a global positioning system (GPS) system, one or more communication systems adapted for communication with systems external to the vehicle such as a vehicle-to-vehicle (V2V), vehicle-to-everything (V2X) or vehicle to satellite (V2S) communication system, and/or one or more other types of telematics components or systems. Telematics system 207 may be configured to support various types of communication including, for example, dedicated short range communications (DSRC), and 5G and other cellular network standards, as well other types of communications.

ECS 200 includes vehicle system sensors 208 which include a plurality of sensor configured to sense operating conditions of prime mover system 120 or constituent systems thereof including ICE 211, M/G 212, ESS 213, PE 214, TX 215, or other systems of vehicle 100. Vehicle system sensors 208 may include one or more temperature sensors configured to sense conditions of or associated with the interior of vehicle 100, ICE 211, M/G 212, ESS 213, PE 214, TX 215, aftertreatment system 219, HVAC system and/or accessories 221, wheels 224, or other components or systems of prime mover system 120 or vehicle 100.

ECS 200 includes vehicle environment sensors 209, also referred to as environment-to-vehicle (E2V) sensors, which include a plurality of sensor configured to sense conditions of or associated with the environment external to the vehicle 100. Vehicle environment sensors 209 may include, for example, RADAR devices or systems, LIDAR devices or systems, proximity sensor devices or systems, or camera and image processing devices or systems, weather sensors, road condition sensors, or combinations thereof.

The illustrated components and systems of ECS 200, as well as other components and systems of ECS 200 are configured to operatively communicate with one another either directly or via one or more networks such as one or more controller area networks (CANs) and may also be configured to communicate with various systems, devices, and sensors of vehicle 100 via dedicated communication links of via one or more CANs.

Figure 4:
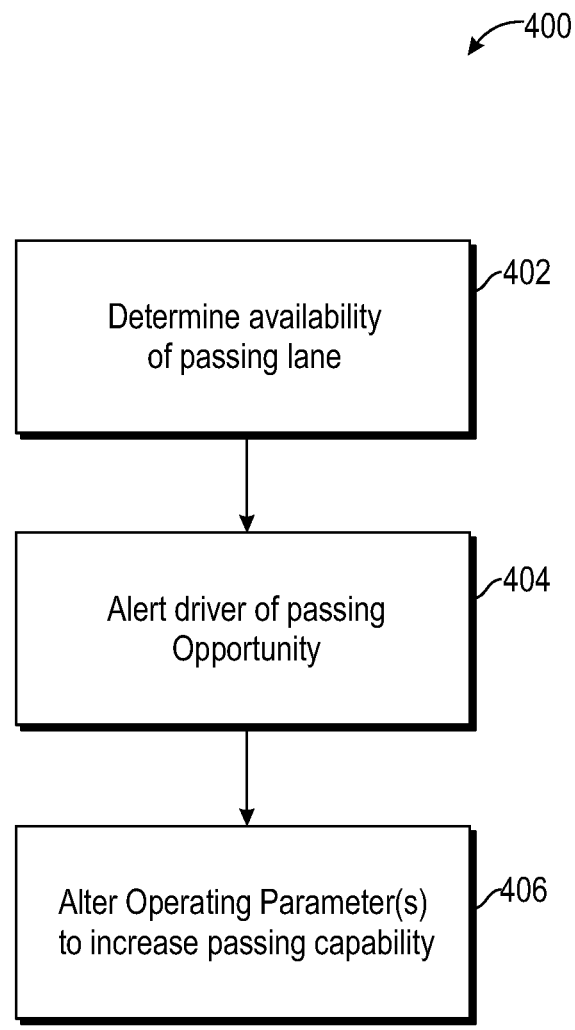
FIG. 4 is a flow diagram of a procedure that can be performed in conjunction with a passing opportunity for the vehicle of FIGS. 1-3.

With reference to FIG. 4 there are illustrated certain aspects of an example process 400 suitable for controlling vehicle 100 to pass obstruction 110 in travel lane 104. Process 400 may be implemented and performed in connection with one or more components of an electronic control system of a vehicle such as ECS 200 of vehicle 100. In describing process 400, references to "an ECS" or "the ECS" shall be understood to be applicable, implementable in connection with, and performed by any suitable electronic control system of a vehicle 100 including. ECS 200 and/or other electronic control systems. Likewise, in describing process 400, references to a component of system of an ECS shall be understood to be applicable, and to refer to the components and systems described in connection with ECS 200 as well as to components and/or other electronic control systems The schematic flow diagram in FIG. 4 and related description which follows provides an illustrative embodiment of performing procedures for identifying a passing opportunity and controlling the vehicle 100 to improve vehicle passing performance. Operations illustrated are understood to be exemplary only, and operations may be combined or divided, and added or removed, as well as re-ordered in whole or part. Certain operations illustrated may be implemented by a computer executing a computer program provided on a non-transitory computer readable storage medium, where the computer program comprises instructions causing the computer to execute one or more of the operations, or to issue commands to other devices to execute one or more of the operations.

Process or method 400 includes an operation 402 to determine, with ECS 200 or other controller or control unit discussed herein, an availability of passing lane 106 for the vehicle 100 to pass the obstruction 110 located in travel lane 104. In response to determining the availability of the passing lane 106 at operation 402, process 400 continues at operation 404 to alert a driver of the vehicle 100 of a passing opportunity to pass the obstruction 110 using the passing lane 106. In response to the passing opportunity and before the driver initiates passing the obstruction 110 at operation 404, process 400 includes an operation 406 to alter, with the ECS 200 or other controller or control unit described herein, at least one operating parameter of the vehicle 100 to increase a passing capability of the vehicle 100.

As used herein, an improvement to and/or increase in a passing capability of vehicle 100 includes providing vehicle 100 with a greater acceleration capability or acceleration potential than would be available if the at least one operating parameter were not altered before the driver initiated passing the obstruction 110. Based on an identification of the passing opportunity, the vehicle 100 is pre-emptively prepared to create additional torque reserve to be made available to the driver before the driver initiates the pass attempt so that the additional torque reserve is readily available at the initiation of the pass attempt and during the pass attempt.

In an embodiment, process 400 includes an operation to identify the presence of a passing lane 106 along the route or roadway 102 while operating vehicle 100. The passing lane 106 can be identified, for example, based on static information such as roadway markings, roadway configuration, route information, forward-looking LIDAR, and/or oncoming traffic information from RADAR. The presence or non-presence of the passing lane can be indicated in the ECS 200.

In an embodiment, process 400 includes identifying the passing lane with ECS 200 by analyzing look-ahead data for a location along the travel lane 104 that permits the passing opportunity. In an embodiment, ECS 200 analyzes route data for a location along the travel lane 104 that permits the passing opportunity. In an embodiment, ECS 200 analyzes traffic data for a location along the travel lane 104 that permits the passing opportunity.

In an embodiment, operation 402 to identify obstruction 110 and/or a passing opportunity is only performed while a passing lane 106 is identified as being present in ECS 200. In an embodiment, the availability of passing lane 106 is determined during operation 402 once an obstruction 110 is identified. In an embodiment, operation 402 includes determining the availability of the passing lane 106 for passing based on the presence of one or more availability factors. The availability factors may include, for example, an oncoming traffic density, spacing, and speed in passing lane 106. RADAR and/or LIDAR can be employed to assess the oncoming traffic density, spacing, and speed in passing lane 106. Information about oncoming traffic may also be communicated to vehicle 100 from a V2V and/or V2X communication system.

Other availability factors to determine the availability of passing lane 106 for the pass attempt include the distance available for passing, the time available for passing, the current speed of vehicle 100, and/or the acceleration potential of vehicle 100. The acceleration potential can be based on one or more of the tire conditions for vehicle 100, ambient conditions, roadway conditions (wet, ice, snow, surface type, etc.), powertrain fault code status of prime mover system 120, anti-lock braking system status, etc. Other availability factors may include the posted speed limit at the passing location, and/or maximum road governor speed for vehicle 100 set by operator, fleet manager, or original equipment manufacturer. Still other availability factors may include the configuration of obstruction 110 indicating a type of vehicle (tractor, buggy, truck, bus, mail carrier, barricade, etc.), detection of a slow moving vehicle sign, a configuration of the slow moving vehicle or obstruction 110, an indication that the obstruction 110 is a school bus and/or a stop arm of the school bus, an indication of a construction zone, a current season/time of year indicating a potential for farm equipment, snow plows, etc.

The availability factors discussed herein may be considered in isolation to identify the passing opportunity, or in combinations of two or more availability factors to identify the passing opportunity. Weightings may be applied to the use of multiple availability factors depending on their applicability or relevance in identifying the availability of passing lane 106 for a pass attempt.

Operation 404 to alert the driver of the availability of the passing opportunity can include a visual and/or audible alert to the driver. The alert may include additional information useful to the driver regarding the passing opportunity. The additional information may include, for example, a minimum vehicle speed needed to complete the pass before the end of the passing zone or oncoming traffic. Other additional information may include look-ahead road or route conditions, such as from a map database or map application, indicating to the driver a route of the second vehicle, look-ahead traffic conditions, and/or look-ahead road conditions. Additional information communicated to the driver could include V2V communications, such as the speed or route of an oncoming vehicle, and/or the speed or route of a vehicle to be passed.

The alert for the passing opportunity at operation 404 can be cancelled based on a change in the oncoming traffic configuration, a safety condition, and/or to avoid a fuel efficiency penalty, such as if the route of the vehicle to be passed indicates it will take an upcoming exit or turn. The alert could also be cancelled in response to a trailing vehicle attempting to overtake vehicle 100 before the pass attempt is initiated. The alert can also be cancelled if the driver of vehicle 100 fails to initiate the pass attempt within a certain threshold period of time. The alert may also be cancelled by a traffic condition in the passing lane 106 prohibiting the passing opportunity, a route condition of the passing lane 106 prohibiting the passing opportunity, and/or a violation of an operating constraint of the vehicle 100 if the pass is initiated, Operation 406 to alter at least one operating parameter of the vehicle 100 to increase a passing capability of the vehicle 100 may include preparing vehicle 100 for a hard acceleration by limiting or reducing the power taken from vehicle 100 by accessories or systems other than the prime mover 122. Operation 406 can be terminated and a return to normal or nominal operating parameters resumed if the driver does not initiate the pass attempt in a threshold period of time, or provides an indication that that passing opportunity will be declined.

One example operating parameter that can be altered at operation 406 is a cylinder deactivation operation for a prime mover 122 that is an internal combustion engine, such as cylinders 216 of ICE 211. Altering the cylinder deactivation operation may include, for example, controlling cylinder deactivation system 220 to terminate a cylinder deactivation operation, disable a cylinder deactivation operation, reduce a number of deactivated cylinders 216, and/or change a pattern of the deactivated cylinders 216.

Other examples of operating parameters that can be altered at operation 406 include disabling one or more non-essential accessories on vehicle 100 that drain electric power and/or torque. Still other examples of operating parameters that can be altered at operation 406 include disabling one or more components connected to the prime mover 122 or drive train 124 line of vehicle 100, such as a cooling fan, radiator fan, compressor, etc.

In other examples of operating parameters that are altered at operation 406, an air flow to the prime mover 122 is increased, such as by increasing a turbocharger output of turbocharger 217, increasing an exhaust gas recirculation flow with EGR system 218, opening an intake throttle, and/or controlling a turbine inlet of turbocharger 217 or an exhaust throttle to increase intake flow. For a prime mover 122 with an energy storage system 213, the state-of-charge of the energy storage system 213 can be preserved or increased to provide stored energy for the pass attempt and/or to avoid re-charging during the pass attempt.

In other examples of operating parameters that are altered at operation 406, a thermal management operation of vehicle 100 is altered to prepare for the pass attempt. For example, an aftertreatment regeneration event of aftertreatment system 219 can be delayed. In another example, one or more components of vehicle 100 can be pre-cooled such as the energy storage system 213, prime mover 122, and/or power electronics 214. In another example, the interior of vehicle 100 is pre-cooled or pre-heated so that cooling or heating is not needed during the pass attempt.

Another example of an operating parameters that can be altered at operation 406 include disabling an advanced driver assistance system 112, such as adaptive cruise control, predictive cruise control, etc., that normally operate to optimize vehicle separation/following distance, lane centering, and/or prime mover output in response to look ahead conditions.

Other examples of operating parameters that can be altered at operation 406 include pre-heating one or more components or fluids of vehicle 100 before initiating the passing attempt. A pre-heating operation can be conducted, for example, in response to a current or recent low load, low speed, and/or idling operation in conjunction with identifying a passing opportunity. In an embodiment of the pre-heating operation, oil temperature is increased for improved viscosity once the pass attempt is initiated. In an embodiment, a battery temperature is increased for more efficient operation viscosity once the pass attempt is initiated. In an embodiment, the exhaust or aftertreatment system temperature is increased for better conversion efficiency once the pass attempt is initiated.

Once the driver initiates the pass attempt, ECS 200 or other control unit may also take one or more additional actions to alter one or more additional operating parameters during the passing attempt. The altering of the one or more additional operating parameters during the pass attempt may include, for example, altering a cylinder deactivation operation by, for example, terminating a cylinder deactivation operation, disabling a cylinder deactivation operation, reducing a number of deactivated cylinders, and/or changing a pattern of the deactivated cylinders using cylinder deactivation system 220.

Another operating parameter that may be altered during the pass attempt is to limit the use of one or more accessories 221, such as an HVAC system. Another operating parameter that may be altered during the pass attempt is to limit or prevent increasing a state-of-charge of the energy storage device 213. Another operating parameter that may be altered during the pass attempt is to initiate operation of an additional prime mover for a dual power mode, such as engaging a motor/generator 212 to output torque in conjunction with an ICE 211. Another operating parameter that may be altered during the pass attempt is to suspend or lift road speed governor limits for vehicle 100 based on one or more conditions that ensure safe operation of vehicle 100.

After the pass attempt is complete, process 400 may include returning to nominal operating conditions for vehicle 100. In addition, the operation of one or more components altered or suspended in response to the pass attempt may be re-assessed and addressed as needed before returning to nominal operations. For example, the condition of aftertreatment system 219 can be assessed to determine whether thermal management is still needed. The state-ofcharge of the energy storage system 213 can be assessed and increased as needed. Operations of the HVAC system/accessories 221, and vehicle component cooling system can also resume.

In an embodiment, ECS 200 is configured to perform operation 402 automatically and without driver intervention to determine the availability of passing lane 106 and/or the passing opportunity to pass the obstruction 110 using the passing lane 106. In an embodiment, ECS 200 is configured to automatically, and without driver intervention, increase a passing capability of the vehicle 100 in response to identifying the passing opportunity.

According to one aspect of the present disclosure, a method for controlling a vehicle to pass an obstruction in a travel lane along which the vehicle is travelling is provided. The method includes determining, with an electronic control system, an availability of a passing lane for the vehicle to pass the obstruction; in response to determining the availability of the passing lane, alerting a driver of the vehicle of a passing opportunity to pass the obstruction using the passing lane; and in response to the passing opportunity and before the driver initiates passing the obstruction, altering, with the electronic control system, at least one operating parameter of the vehicle to increase a passing capability of the vehicle.

In an embodiment, the obstruction includes a second vehicle in the travel lane moving slower than the vehicle. In a further embodiment, alerting the driver further includes one or more of: indicating to the driver a minimum speed to complete the pass; indicating to the driver a route of the second vehicle; indicating to the driver look-ahead traffic conditions; and indicating to the driver look-ahead road conditions.

In an embodiment, the method includes, in response to the driver initiating passing the obstruction, altering at least one additional operating parameter of the vehicle with the electronic control system to improve the passing performance of the vehicle during passing the obstruction. In a further embodiment, altering the at least one additional operating parameter of the vehicle in response to the driver initiating passing the obstruction includes: altering a cylinder deactivation operation of a prime mover of the vehicle; reducing or preventing an increase of a state-of-charge of an energy storage device of the vehicle; reducing an output of one or more accessories of the vehicle; decreasing an airflow to an interior of the vehicle for cooling or heating the interior; engaging an additional torque output device to propel the vehicle; and altering a road speed governor limit of the vehicle.

In an embodiment, determining the availability of the passing lane is based on at least one of: a traffic condition in the passing lane; a current speed of the vehicle in the travel lane; an acceleration potential of the vehicle; a distance available to pass the obstruction; a time available to pass the obstruction; and a speed limit for the vehicle.

In an embodiment, the method includes identifying, with the electronic control system, the passing lane by at least one of: analyzing look-ahead data for a location along the travel lane that permits the passing opportunity; analyzing route data for a location along the travel lane that permits the passing opportunity; and analyzing traffic data for a location along the travel lane that permits the passing opportunity.

In an embodiment, the method includes altering the at least one operating parameter before the driver initiates passing the obstruction includes altering a cylinder deactivation operation of a prime mover of the vehicle.

In an embodiment, altering the at least one operating parameter before the driver initiates passing the obstruction includes disabling one or more accessories of the vehicle or disengaging one or more components driven by a prime mover of the vehicle from the prime mover.

In an embodiment, altering the at least one operating parameter before the driver initiates passing the obstruction includes increasing an air flow to a prime mover of the vehicle.

In an embodiment, altering the at least one operating parameter before the driver initiates passing the obstruction includes increasing a rate of cooling of one or more components of the vehicle.

In an embodiment, altering the at least one operating parameter before the driver initiates passing the obstruction includes delaying a thermal management operation of an aftertreatment system of the vehicle.

In an embodiment, altering the at least one operating parameter before the driver initiates passing the obstruction includes increasing an airflow to an interior of the vehicle that cools or heats the interior.

In an embodiment, altering the at least one operating parameter before the driver initiates passing the obstruction includes at least one of: maintaining or increasing a state-of-charge of an energy storage device of the vehicle; and disabling an advanced driver assistance system of the vehicle.

In an embodiment, the method includes alerting the driver the passing opportunity is cancelled in response to: the vehicle being passed by a second vehicle; a traffic condition in the passing lane prohibiting the passing opportunity; a route condition of the passing lane prohibiting the passing opportunity; and a violation of an operating constraint of the vehicle if the pass is initiated.

According to another aspect of the present disclosure, a system is disclosed that includes a vehicle including a prime mover and a drivetrain coupled to the prime mover operable to propel the vehicle along a travel lane and an electronic control system operatively coupled with the prime mover. The electronic control system is configured to perform the following operations during operation of the vehicle: determine an availability of a passing lane for the vehicle to pass an obstruction in the travel lane of travel of the vehicle; alert a driver of the vehicle of a passing opportunity to pass the obstruction using the passing lane in response to determining the passing lane is available; and alter at least one operating parameter of the vehicle to increase a passing capability of the vehicle before the driver initiates passing the obstruction.

According to another aspect of the present disclosure, an electronic control system (ECS) is disclosed that is configured to perform the following operations during operation of the vehicle: determine an availability of a passing lane for the vehicle to pass an obstruction in the travel lane of travel of the vehicle; alert a driver of the vehicle of a passing opportunity to pass the obstruction using the passing lane in response to determining the passing lane is available; and alter at least one operating parameter of the vehicle to increase a passing capability of the vehicle before the driver initiates passing the obstruction.

In an embodiment of the system and/or ECS, the at least one operating parameter altered by the ECS before the driver initiates passing the obstruction includes at least one of: a decrease in cylinder deactivation of the prime mover of the vehicle; a disablement of one or more accessories of the vehicle or disengagement of one or more components driven by the prime mover of the vehicle from the prime mover; an increased air flow to the prime mover of the vehicle; an increased rate of cooling of one or more components of the vehicle; a delay in a thermal management operation of an aftertreatment system of the vehicle; an increased airflow to heat or cool an interior of the vehicle; an increase in a state-of-charge of an energy storage device of the vehicle; and disablement of an advanced driver assistance system of the vehicle.

In an embodiment of the system and/or ECS, the ECS is configured to, in response to the driver initiating passing the obstruction, alter at least one additional operating parameter of the vehicle to improve the passing performance of the vehicle during passing the obstruction.

In an embodiment of the system and/or ECS, the at least one additional operating parameter of the vehicle altered by the ECS in response to the driver initiating passing the obstruction includes at least one of: a decrease in cylinder deactivation of the prime mover of the vehicle; an increase of a state-of-charge of an energy storage device of the vehicle; a reduced output from one or more accessories of the vehicle; a reduced airflow for heating or cooling an interior of the vehicle; an additional torque output device is engaged to propel the vehicle; and an increase in a road speed governor limit.

In an embodiment of the system and/or ECS, the ECS is configured to identify the passing lane by at least one of: analyzing look-ahead data for a location along the travel lane that permits the passing opportunity; analyzing route data for a location along the travel lane that permits the passing opportunity; and analyzing traffic data for a location along the travel lane that permits the passing opportunity.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for controlling a vehicle to pass an obstruction in a travel lane along which the vehicle is travelling, the method comprising:
   determining, with an electronic control system, an availability of a passing lane for the vehicle to pass the obstruction;
   in response to determining the availability of the passing lane, alerting a driver of the vehicle of a passing opportunity to pass the obstruction using the passing lane;
   in response to the passing opportunity and before the driver initiates passing the obstruction, pre-emptively preparing the vehicle for a pass attempt by automatically creating an additional torque reserve that is made available to the driver before the driver initiates the pass attempt of the obstruction by altering, with the electronic control system, at least one operating parameter of the vehicle to increase a passing capability of the vehicle; and
   in response to the driver initiating passing the obstruction, altering at least one additional operating parameter of the vehicle with the electronic control system to improve the passing performance of the vehicle during passing the obstruction,
   wherein the at least one operating parameter of the vehicle altered with the electronic control system before the driver initiates passing the obstruction to automatically create the additional torque reserve made available to the driver before the driver initiates the pass attempt includes maintaining or increasing a state-of-charge of an energy storage device of the vehicle; and
   wherein the at least one additional operating parameter of the vehicle altered with the electronic control system during passing the obstruction includes reducing or preventing an increase of a state-of-charge of an energy storage device of the vehicle.

2. The method of claim 1, wherein the obstruction includes a second vehicle in the travel lane moving slower than the vehicle.

3. The method of claim 2, wherein alerting the driver further includes one or more of:
   indicating to the driver a minimum speed to complete the pass;
   indicating to the driver a route of the second vehicle;
   indicating to the driver look-ahead traffic conditions; and
   indicating to the driver look-ahead road conditions.

4. The method of claim 1, wherein altering the at least one additional operating parameter of the vehicle in response to the driver initiating passing the obstruction includes:
   altering a cylinder deactivation operation of a prime mover of the vehicle;
   reducing an output of one or more accessories of the vehicle;
   decreasing an airflow to an interior of the vehicle for cooling or heating the interior;
   engaging an additional torque output device to propel the vehicle; and
   altering a road speed governor limit of the vehicle.

5. The method of claim 1, wherein determining the availability of the passing lane is based on at least one of:
   a traffic condition in the passing lane;
   a current speed of the vehicle in the travel lane;
   an acceleration potential of the vehicle;
   a distance available to pass the obstruction;
   a time available to pass the obstruction; and
   a speed limit for the vehicle.

6. The method of claim 1, further comprising identifying, with the electronic control system, the passing lane by at least one of:
   analyzing look-ahead data for a location along the travel lane that permits the passing opportunity;
   analyzing route data for a location along the travel lane that permits the passing opportunity; and
   analyzing traffic data for a location along the travel lane that permits the passing opportunity.

7. The method of claim 1, wherein altering the at least one operating parameter before the driver initiates passing the obstruction includes altering a cylinder deactivation operation of a prime mover of the vehicle to automatically create the additional torque reserve that is made available to the driver before the driver initiates the pass attempt.

8. The method of claim 1, wherein altering the at least one operating parameter before the driver initiates passing the obstruction includes disabling one or more accessories of the vehicle to automatically create the additional torque reserve that is made available to the driver before the driver initiates the pass attempt or disengaging one or more components driven by a prime mover of the vehicle from the prime mover.

9. The method of claim 1, wherein altering the at least one operating parameter before the driver initiates passing the obstruction includes increasing an air flow to a prime mover of the vehicle to automatically create the additional torque reserve that is made available to the driver before the driver initiates the pass attempt.

10. The method of claim 1, wherein altering the at least one operating parameter before the driver initiates passing the obstruction includes increasing a rate of cooling of one or more components of the vehicle to automatically create the additional torque reserve that is made available to the driver before the driver initiates the pass attempt.

11. The method of claim 1, wherein altering the at least one operating parameter before the driver initiates passing the obstruction includes delaying a thermal management operation of an aftertreatment system of the vehicle to automatically create the additional torque reserve that is made available to the driver before the driver initiates the pass attempt.

12. The method of claim 1, wherein altering the at least one operating parameter before the driver initiates passing the obstruction includes increasing an airflow to an interior of the vehicle that cools or heats the interior to automatically create the additional torque reserve that is made available to the driver before the driver initiates the pass attempt.

13. The method of claim 1, wherein altering the at least one operating parameter before the driver initiates passing the obstruction to automatically create the additional torque reserve that is made available to the driver before the driver initiates the pass attempt includes
disabling an advanced driver assistance system of the vehicle.

14. The method of claim 1, further alerting the driver the passing opportunity is cancelled in response to:
the vehicle being passed by a second vehicle;
a traffic condition in the passing lane prohibiting the passing opportunity;
a route condition of the passing lane prohibiting the passing opportunity; and
a violation of an operating constraint of the vehicle if the pass is initiated.

15. A system, comprising:
a vehicle including a prime mover and a drivetrain coupled to the prime mover operable to propel the vehicle along a travel lane;
an electronic control system operatively coupled with the prime mover, wherein the electronic control system is configured to perform the following operations during operation of the vehicle:
determine an availability of a passing lane for the vehicle to pass an obstruction in the travel lane of travel of the vehicle;
alert a driver of the vehicle of a passing opportunity to pass the obstruction using the passing lane in response to determining the passing lane is available;
pre-emptively prepare the vehicle by automatically creating an additional torque reserve that is made available to the driver before the driver initiates a pass attempt of the obstruction by altering at least one operating parameter of the vehicle to increase a passing capability of the vehicle before the driver initiates passing the obstruction; and
alter at least one additional operating parameter of the vehicle with the electronic control system to improve the passing performance of the vehicle during passing the obstruction,
wherein the at least one operating parameter altered before the driver initiates passing the obstruction to automatically create the additional torque reserve that is made available to the driver before the driver initiates the pass attempt is to maintain or increase a state-of-charge of an energy storage device of the vehicle; and
wherein the at least one additional operating parameter of the vehicle altered during passing the obstruction is to reduce or prevent an increase of a state-of-charge of the energy storage device of the vehicle.

16. The system of claim 15, wherein the at least one operating parameter altered by the electronic control system to automatically create the additional torque reserve that is made available to the driver before the driver initiates the pass attempt to pass the obstruction includes at least one of:
a decrease in cylinder deactivation of the prime mover of the vehicle;
a disablement of one or more accessories of the vehicle or disengagement of one or more components driven by the prime mover of the vehicle from the prime mover;
an increased air flow to the prime mover of the vehicle;
an increased rate of cooling of one or more components of the vehicle;
a delay in a thermal management operation of an aftertreatment system of the vehicle;
an increased airflow to heat or cool an interior of the vehicle;
and
disablement of an advanced driver assistance system of the vehicle.

17. The system of claim 16, wherein the electronic control system is configured to, in response to the driver initiating passing the obstruction, alter at least one additional operating parameter of the vehicle to improve the passing performance of the vehicle during passing the obstruction.

18. The system of claim 17, wherein the at least one additional operating parameter of the vehicle altered by the electronic control system in response to the driver initiating passing the obstruction includes at least one of:
a decrease in cylinder deactivation of the prime mover of the vehicle;
a reduced output from one or more accessories of the vehicle;
a reduced airflow for heating or cooling an interior of the vehicle;
an additional torque output device is engaged to propel the vehicle; and
an increase in a road speed governor limit.

19. The system of claim 15, wherein the electronic control system is configured to identify the passing lane by at least one of:
analyzing look-ahead data for a location along the travel lane that permits the passing opportunity;
analyzing route data for a location along the travel lane that permits the passing opportunity; and
analyzing traffic data for a location along the travel lane that permits the passing opportunity.

* * * * *